US010089225B2

(12) United States Patent
Chang

(10) Patent No.: US 10,089,225 B2
(45) Date of Patent: Oct. 2, 2018

(54) IMPROVING GARBAGE COLLECTION EFFICIENCY BY REDUCING PAGE TABLE LOOKUPS

(71) Applicant: Silicon Motion, Inc., Jhubei (TW)

(72) Inventor: Yi-Kang Chang, New Taipei (TW)

(73) Assignee: Silicon Motion, Inc., Jhubei (TW)

( * ) Notice: Subject to any disclaimer, the term of this patent is extended or adjusted under 35 U.S.C. 154(b) by 160 days.

(21) Appl. No.: 14/839,073

(22) Filed: Aug. 28, 2015

(65) Prior Publication Data

US 2016/0124845 A1 May 5, 2016

(30) Foreign Application Priority Data

Oct. 31, 2014 (TW) .............................. 103137753 A

(51) Int. Cl.
*G06F 12/02* (2006.01)
*G06F 12/10* (2016.01)
*G06F 12/1009* (2016.01)

(52) U.S. Cl.
CPC ...... *G06F 12/0246* (2013.01); *G06F 12/1009* (2013.01); *G06F 2212/7201* (2013.01)

(58) Field of Classification Search
None
See application file for complete search history.

(56) References Cited

U.S. PATENT DOCUMENTS

| 2009/0198952 A1* | 8/2009 | Khmelnitsky ...... G06F 12/0246 711/206 |
| 2011/0055458 A1 | 3/2011 | Kuehne |
| 2014/0219020 A1 | 8/2014 | Kwak |
| 2015/0074327 A1* | 3/2015 | Xu ...................... G06F 12/0246 711/103 |

FOREIGN PATENT DOCUMENTS

| CN | 103136121 A | 6/2013 |
| CN | 103678145 A | 3/2014 |
| TW | I272483 B | 2/2007 |
| TW | I288328 B | 10/2007 |
| TW | 201202926 | 1/2012 |
| TW | 201324144 | 6/2013 |
| TW | 201413453 | 4/2014 |

OTHER PUBLICATIONS

Office Action of corresponding TW application, published on Oct. 8, 2015.
Office Action of corresponding TW application, published on Jan. 18, 2016.

* cited by examiner

*Primary Examiner* — Gary W. Cygiel
(74) *Attorney, Agent, or Firm* — Wang Law Firm, Inc.

(57) ABSTRACT

A flash memory control technology with high efficiency, which records a logical page table in a random access memory. The logical pages that have been collected from a data-interspersed block into a destination block of a flash memory are recorded in the logical page table. Without accessing a logical-to-physical address mapping table stored in the flash memory, the physical pages in the data-interspersed block corresponding to the logical pages recorded in the logical page table are regarded as containing invalid data.

10 Claims, 3 Drawing Sheets

IMPROVING GARBAGE COLLECTION EFFICIENCY BY REDUCING PAGE TABLE LOOKUPS

CROSS REFERENCE TO RELATED APPLICATIONS

This Application claims priority of Taiwan Patent Application No. 103137753, filed on Oct. 31, 2014, the entirety of which is incorporated by reference herein.

BACKGROUND OF THE INVENTION

Field of the Invention

The present invention relates to data storage devices with flash memory and flash memory control methods.

Description of the Related Art

Flash memory, a data storage medium, is common in today's data storage devices. A NAND flash is one common type of flash memory.

For example, flash memory is typically used in memory cards, USB flash devices, solid-state drives, and so on. In another application with multi-chip package technology, a NAND flash chip and a controller chip are combined in one package as an embedded multi-media card (e.g. eMMC).

The storage space of a flash memory generally provides a plurality of physical blocks, and each physical block includes a plurality of physical pages. To release storage space for reuse, an erase operation has to be performed on a block-by-block basis, to release space one block at a time. When updating data, the new data is written into a spare space rather than being overwritten onto old data, and the old data has to be invalidated. Thus, the storage space management of flash memory is more complex than other storage mediums. A controller design especially for flash memory is therefore called for.

BRIEF SUMMARY OF THE INVENTION

A flash memory control technology with high efficiency is shown.

A data storage device in accordance with an exemplary embodiment of the disclosure comprises a flash memory and a control unit. The flash memory provides a storage space that is divided into a plurality of physical blocks with each physical block comprising a plurality of physical pages. The control unit comprises a microcontroller and a random access memory and is coupled between a host and the flash memory. The microcontroller is configured to record a logical page table in the random access memory to indicate logical pages that have been collected from a data-interspersed block between the plurality of physical blocks into a destination block between the plurality of physical blocks. The microcontroller is further configured to regard the physical pages within the data-interspersed block that correspond to the logical pages recorded in the logical page table as containing invalid data without downloading a logical-to-physical address mapping table from the flash memory to determine whether the physical page contains valid data or invalid data based on the logical-to-physical address mapping table. Without the download of the logical-to-physical address mapping table that consumes system resources, the operating efficiency of flash memory is considerably improved.

A flash memory control method in accordance with an exemplary embodiment of the disclosure comprises the following steps: recording a logical page table in a random access memory to indicate logical pages that have been collected from a data-interspersed block between a plurality of physical blocks of a flash memory into a destination block allocated from the plurality of physical blocks; and regarding the physical pages within the data-interspersed block that correspond to the logical pages recorded in the logical page table as containing invalid data without downloading a logical-to-physical address mapping table from the flash memory to determine whether the physical page contains valid data or invalid data based on the logical-to-physical address mapping table.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments for carrying out the invention. This description is made for the purpose of illustrating the general principles of the invention and should not be taken in a limiting sense. The scope of the invention is best determined by reference to the appended claims.

Figure 1:
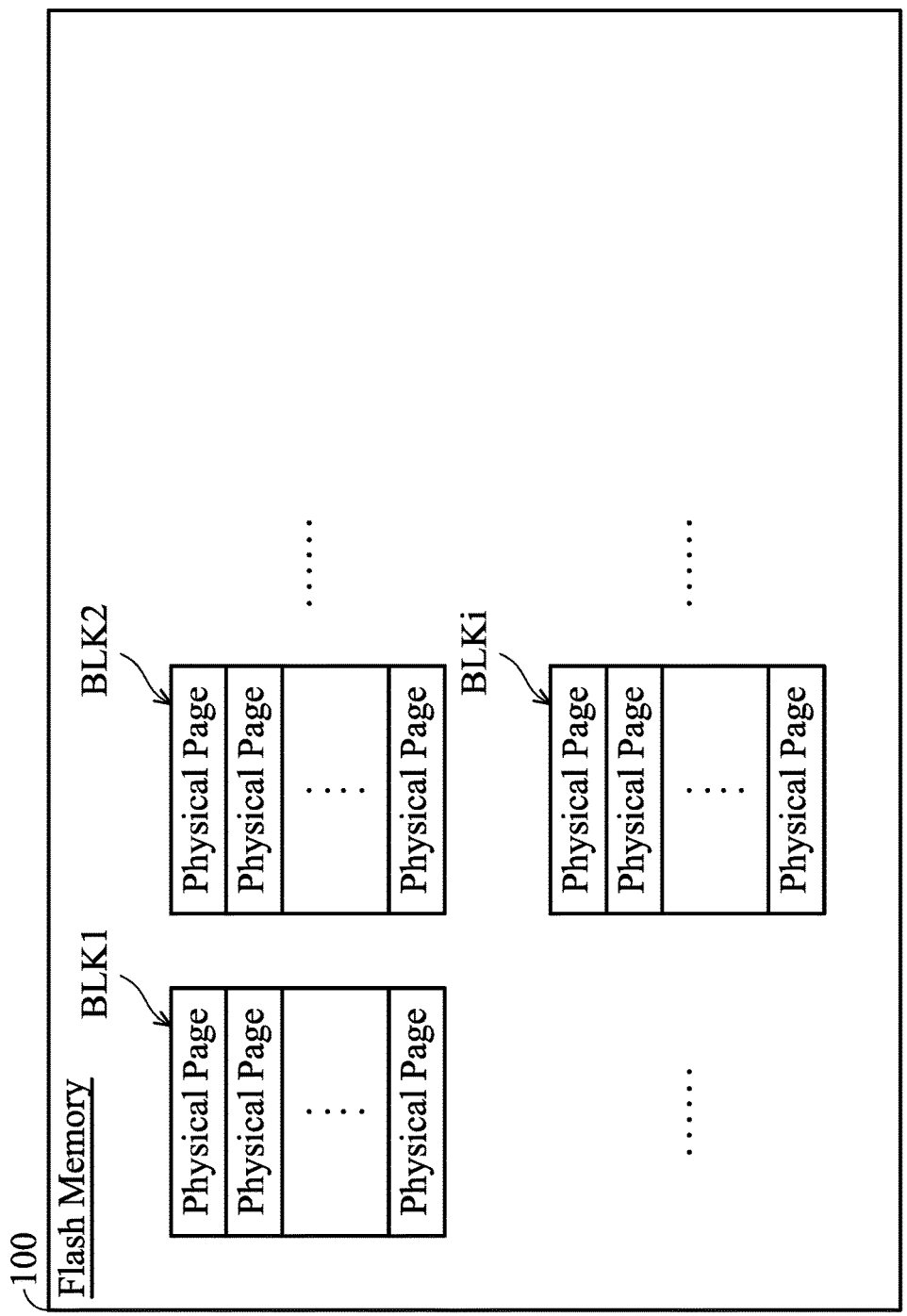
FIG. 1 depicts a storage space provided by a flash memory 100.

FIG. 1 depicts a storage space provided by a flash memory 100, which is divided into a plurality of physical blocks BLK1, BLK2 . . . BLKi . . . . Each physical block comprises a plurality of physical pages. The host side issuing write commands in logical addresses dynamically uses the storage space of a flash memory. Thus, a dynamic logical-to-physical address mapping relationship is established.

Figure 2:
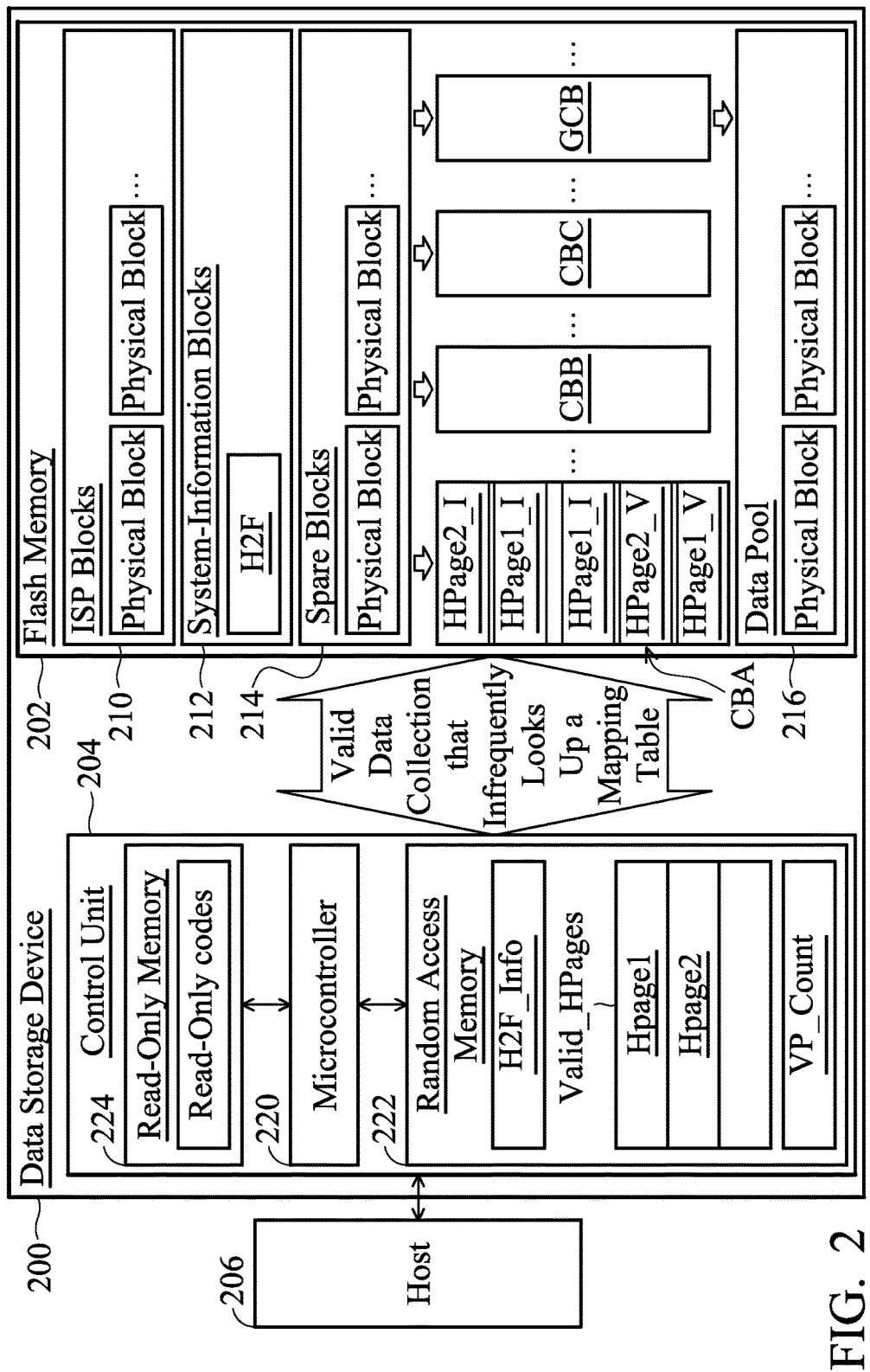
FIG. 2 depicts a data storage device 200 in accordance with an exemplary embodiment of the disclosure.

FIG. 2 depicts a data storage device 200 in accordance with an exemplary embodiment of the disclosure, which comprises a flash memory 202 and a control unit 204. The control unit 204 is coupled between a host 206 and the flash memory 202 to operate the flash memory 202 in accordance with the commands issued from the host 206.

The storage space of the flash memory 202 is allocated to provide ISP (in-system-program) blocks 210, system-information blocks 212, spare blocks 214, run-time write blocks CBA, CBC, CBC . . . , and a data pool 216. The ISP blocks 210 store in-system programs (ISPs). The system-information blocks 212 include a block storing logical-to-physical address mapping table H2F. The run-time write blocks, CBA, CBC and CBC . . . , are allocated from the spare blocks 214 for reception of write data. In an exemplary embodiment, garbage collection (a.k.a. valid data collection) is performed to collect and push the valid data distributed over the run-time write blocks CBA, CBC, CBC . . . into the data pool 216. The valid data collection of the run-time write blocks CBA, CBC, CBC . . . is discussed with respect to FIG. 2. A destination block GCB is newly allocated to collect the valid data distributed over the run-time write blocks CBA, CBC, CBC. The destination block GCB filled with data may be pushed into the data pool 216.

The control unit 204 includes a microcontroller 220, a random access memory 222 (e.g. an SRAM) and a read-only memory 224. The read-only memory 224 stores read-only codes (e.g. ROM code). The microcontroller 220 operates by executing the ROM code stored in the read-only memory 224 or/and by executing the ISPs stored in the ISP blocks 210 of the flash memory 202.

As shown, the microcontroller 220 is configured to record a logical page table Valid_HPages in the random access memory 222. The logical page table Valid_HPages is provided exclusively to a data-interspersed block. As shown, the run-time write block CBA is regarded as the data-interspersed block. In the run-time write block CBA, there are one physical page of valid data Hpage1_V and two physical pages of invalid data Hpage1_I corresponding to the logical page Hpage1. The run-time write block CBA further contains a physical page of valid data Hpage2_V and a physical page of invalid data Hpage2_I corresponding to the logical page Hpage2. The logical pages Hpage1 and Hpage2 are recorded into the logical page table Valid_HPages after the valid data Hpage1_V and Hpage2_V corresponding thereto is moved to the destination block GCB. According to the logical page table Valid_HPages (with the logical pages Hpage1 and Hpage2 recorded thereon), the microcontroller 220 regards the physical pages corresponding to the logical pages Hpage1 and Hpage2 in the data-interspersed block CBA as containing invalid data without checking the logical-to-physical page mapping information. It means that there is no need to download the logical-to-physical address mapping table H2F from the flash memory 202 to determine whether a physical page contains valid data or invalid data based on the logical-to-physical address mapping table H2F. A high amount of system resources is usually required to download the logical-to-physical address mapping table H2F. In this disclosure, however, the redundant download and checking operations for the logical-to-physical address mapping table H2F is reduced. Thus, the system efficiency is considerably improved.

In the exemplary embodiment of FIG. 2, the microcontroller 220 is further configured to allocate the random access memory 222 to store logical-to-physical address mapping information H2F_Info and a valid page count VP_Count to assist in moving valid data from the data-interspersed block CBA to the destination block GCB. The logical-to-physical address mapping information H2F_Info is downloaded from the flash memory 202 by accessing the logical-to-physical address mapping table H2F. The valid page count VP_Count shows the number of physical pages containing valid data within the data-interspersed block CBA and is controlled by the microcontroller 220. The microcontroller 220 may be configured to decrease the valid page count VP_Count every time the data stored in one physical page of the data-interspersed block CBA is moved to the destination block GCB. The microcontroller 220 is further configured to finish collecting data from the data-interspersed block CBA when the valid page count VP_Count is decreased down to zero. For example, after finishing collecting data from the data-interspersed block CBA, the procedure may be changed to regard the run-time write block CBB as the data-interspersed block. The microcontroller 220 may be further configured to collect valid data from the end of the data-interspersed block CBA (e.g. from the ending physical page of the block CBA), which is conducive to valid data collection.

Figure 3:
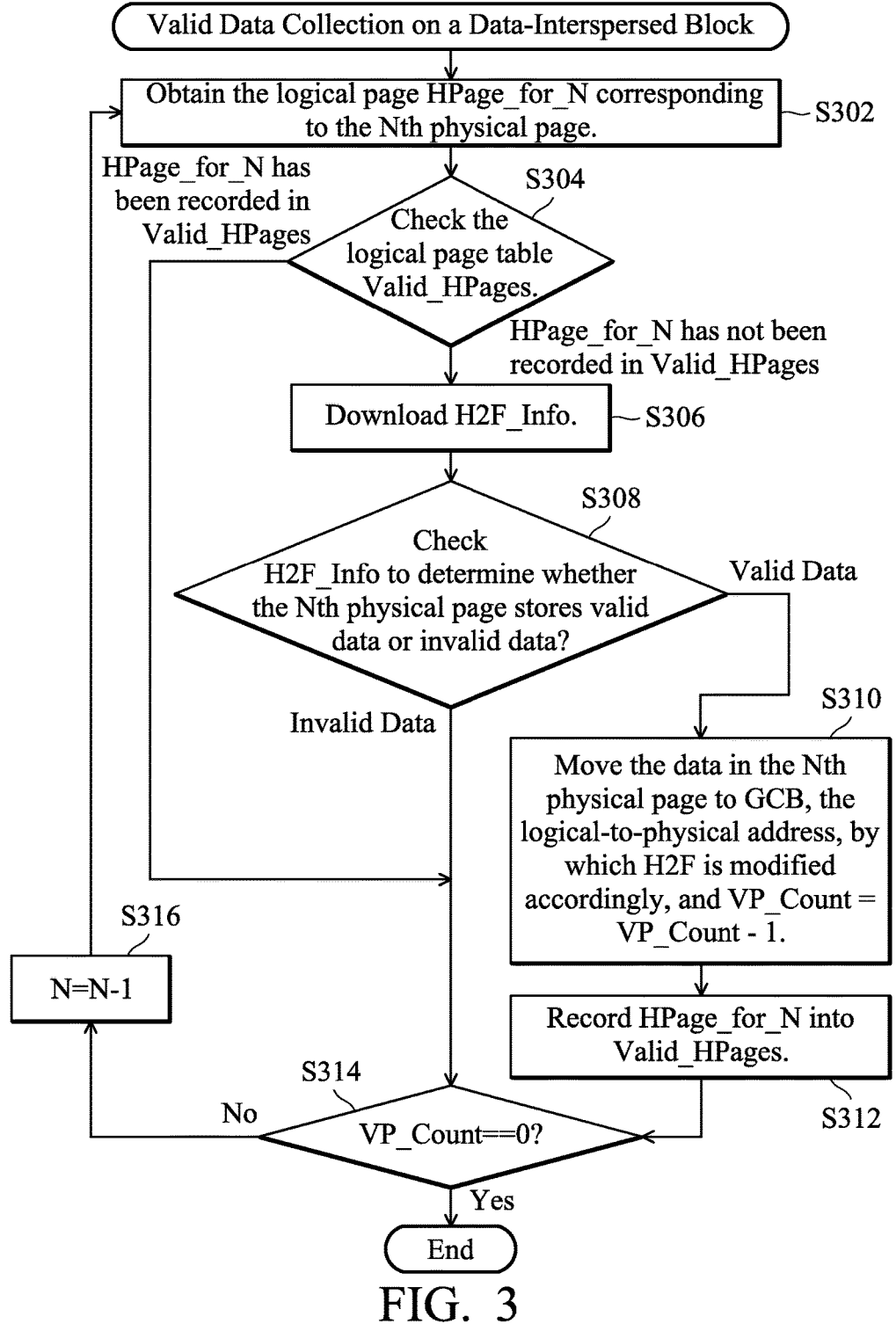
FIG. 3 is a flowchart depicting how to move valid data from a data-interspersed block to a destination block in accordance with an exemplary embodiment of the disclosure.

FIG. 3 is a flowchart depicting how to move valid data from a data-interspersed block to a destination block in accordance with an exemplary embodiment of the disclosure, which is discussed in the following paragraphs with respect to FIG. 2 to show how the valid data in the data-interspersed block CBA is moved to the destination block GCB. The internal information in the $N_{th}$ physical page of the physical block CBA is read in step S302, to obtain the logical page HPage_for_N corresponding to the $N_{th}$ physical page. N is a number which also shows the position of the physical page in the data-interspersed block CBA. In step S304, the logical page table Valid_HPages is checked. When the logical page HPage_for_N is not recorded in the logical page table Valid_HPages, step S306 is performed to download the logical-to-physical address mapping table H2F and thereby the logical-to-physical address mapping information H2F_Info is stored in the random access memory 222. In step S308, the logical-to-physical address mapping information H2F_Info is checked to determine whether the $N_{th}$ physical page stores valid data or invalid data. For example, it is checked whether the logical page HPage_for_N corresponding to the $N_{th}$ physical page matches the information recorded in the logical-to-physical address mapping information H2F_Info. When the logical page corresponding to the $N_{th}$ physical page matches that stored in the logical-to-physical address mapping information H2F_Info, the $N_{th}$ physical page is regarded as containing valid data and step S310 is performed to move the data in the $N_{th}$ physical page to the destination block GCB, the logical-to-physical address mapping table H2F is modified accordingly, and the valid page count VP_Count of the data-interspersed block CBA is decreased. Furthermore, step S312 is performed to record the logical page HPage_for_N into the logical page table Valid_HPages. Step S314 is performed to check whether the valid page count VP_Count is zero. When the valid page count VP_Count is decreased down to zero, it is finished collecting data from the block CBA. When it is determined in step S308 that the $N_{th}$ physical page contains invalid data, step S314 is still performed to check whether the block CBA still contains valid data. When it is determined in step S314 that the valid page count VP_Count has not been decreased down to zero, step S316 is performed to decrease the number of N and step S302 is performed again. The initial value of N is set to start the valid data collection on the data-interspersed block CBA from the ending physical page of the data-interspersed block CBA.

The invention further involves flash memory control methods, which are not limited to any specific controller architecture. Furthermore, any technique using the aforementioned concept to control a flash memory is within the scope of the invention.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A data storage device, comprising:
   a flash memory, providing a storage space that is divided into a plurality of physical blocks with each physical block further divided into a plurality of physical pages; and a control unit, comprising a microcontroller and a random access memory, coupled between a host and the random access memory;

wherein:

the microcontroller is configured to record a logical page table in the random access memory, the logical page table being provided exclusively for garbage collection, the logical page table listing logical pages that have been collected for garbage collection from a data-interspersed block between the plurality of physical blocks into a destination block between the plurality of physical blocks; and without downloading a logical-to-physical address mapping table from the flash memory, the microcontroller is configured to regard the physical pages within the data-interspersed block that correspond to the logical pages in the logical page table as containing invalid data and does not move the invalid data from the data-interspersed block to the destination block for garbage collection.

2. The data storage device as claimed in claim 1, wherein:

the microcontroller is configured to record a valid page count in the random access memory to show how many physical pages contain valid data in the data-interspersed block.

3. The data storage device as claimed in claim 2, wherein:

the microcontroller is configured to decrease the valid page count every time one physical page in the data-interspersed block is collected into the destination block.

4. The data storage device as claimed in claim 3, wherein:

the microcontroller is configured to finish collecting data from the data-interspersed block when the valid page count is decreased down to zero.

5. The data storage device as claimed in claim 4, wherein:

the microcontroller is configured to start collecting valid data of the data-interspersed block from an ending physical page of the data-interspersed block.

6. A flash memory control method, comprising:

recording a logical page table in a random access memory, the logical page table being provided exclusively for garbage collection, the logical page table listing logical pages that have been collected for garbage collection from a data-interspersed block of the flash memory into a destination block of the flash memory; and regarding, without downloading a logical-to-physical address mapping table from the flash memory, physical pages within the data-interspersed block corresponding to the logical pages which have been listed in the logical page table as containing invalid data and not moving the invalid data from the data-interspersed block to the destination block for garbage collection.

7. The flash memory control method as claimed in claim 6, further comprising:

recording a valid page count in the random access memory to show how many physical pages contain valid data in the data-interspersed block.

8. The flash memory control method as claimed in claim 7, further comprising:

decreasing the valid page count every time one physical page in the data-interspersed block is collected into the destination block.

9. The flash memory control method as claimed in claim 8, further comprising:

finishing collecting data from the data-interspersed block when the valid page count is decreased down to zero.

10. The flash memory control method as claimed in claim 9, further comprising:

starting to collect valid data of the data-interspersed block from an ending physical page of the data-interspersed block.

* * * * *